United States Patent [19]

Holland et al.

[11] 4,162,886
[45] Jul. 31, 1979

[54] DEVICE FOR REMOVING A RUNNER FROM A MULTIPLE PLATE DIE

[76] Inventors: Maeford J. Holland, 845 Weslyan Dr., Fairfield, Ohio 45014; Robert B. Raines, 3490 Sodom Rd., Hamersville, Ohio 45130

[21] Appl. No.: 885,954

[22] Filed: Mar. 13, 1978

[51] Int. Cl.$^2$ .......................... B29C 1/00; B29F 1/14
[52] U.S. Cl. .................................. 425/556; 264/334
[58] Field of Search ............... 425/556, 554; 264/334

[56] References Cited

U.S. PATENT DOCUMENTS

| | | | |
|---|---|---|---|
| 2,217,661 | 10/1940 | Anderson | 425/556 |
| 2,313,476 | 3/1943 | Neff | 425/556 |
| 3,645,492 | 2/1972 | Edlis | 425/556 |
| 3,669,592 | 6/1972 | Miller | 425/556 |
| 4,064,208 | 12/1977 | Hanning | 264/334 |

Primary Examiner—W. E. Hoag
Attorney, Agent, or Firm—James W. Pearce; Roy F. Schaeperklaus

[57] ABSTRACT

An injection molding machine utilizing a multiple plate die which is provided with a positive acting runner ejector. The runner ejector is provided with a tubular head extending into a cavity at a face of one of the die plates in which a runner forms so that the runner is molded on the head of the tubular member. The tubular member is moved by an air cylinder in the direction of die plate opening for pulling the runner clear of die surfaces. A plunger rod within the tubular member is moved lengthwise of the tubular member to mechanically release the runner from the head of the tubular member. Air under pressure is projected along the tubular member around the plunger rod to cause jettisoning of the runner from the multiple plate die.

10 Claims, 6 Drawing Figures

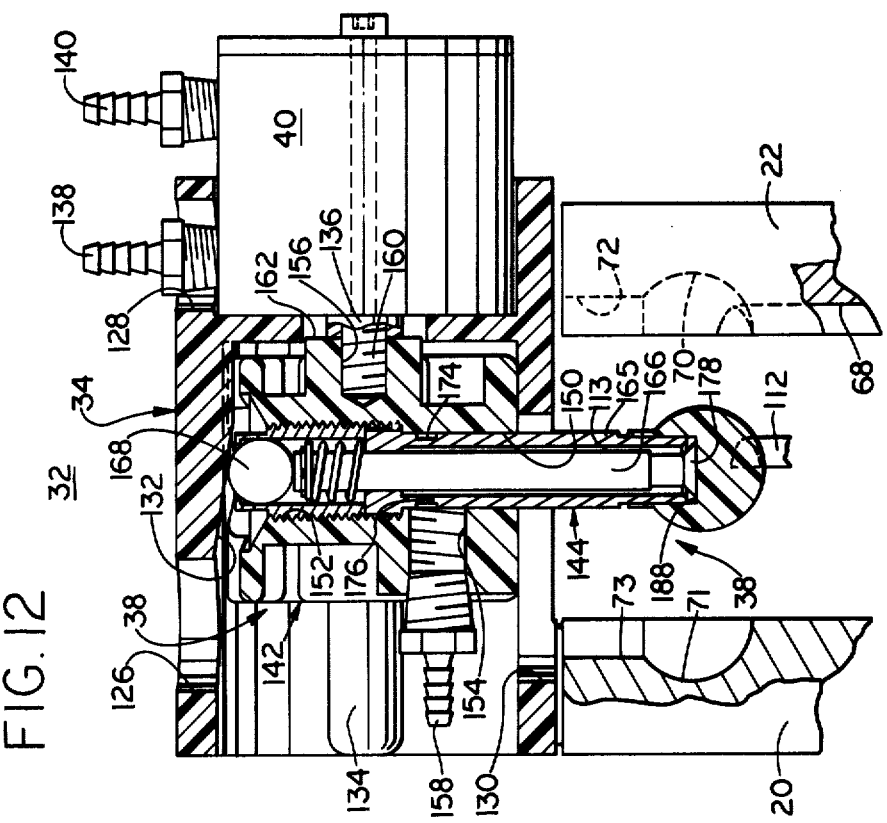
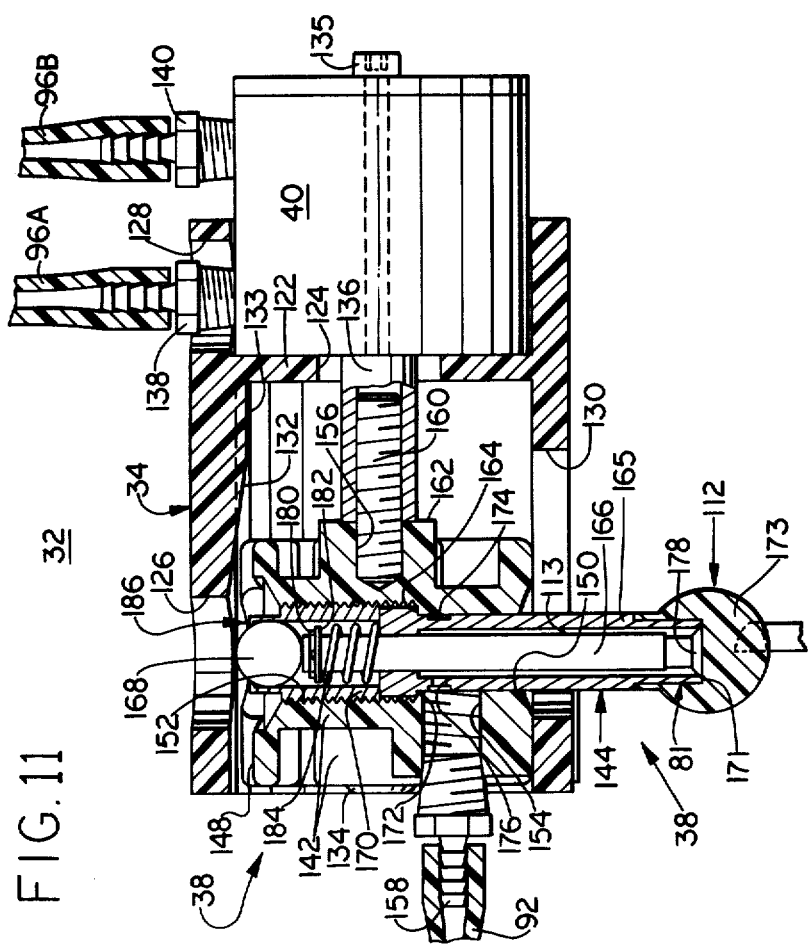

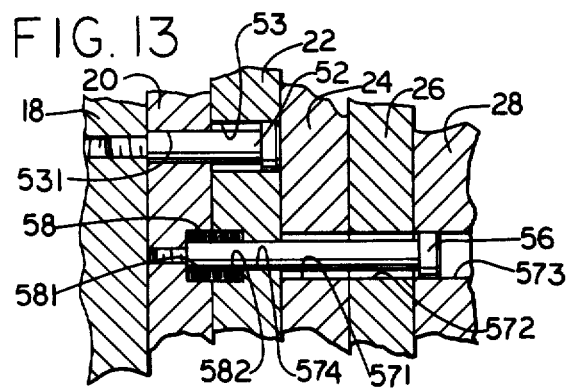
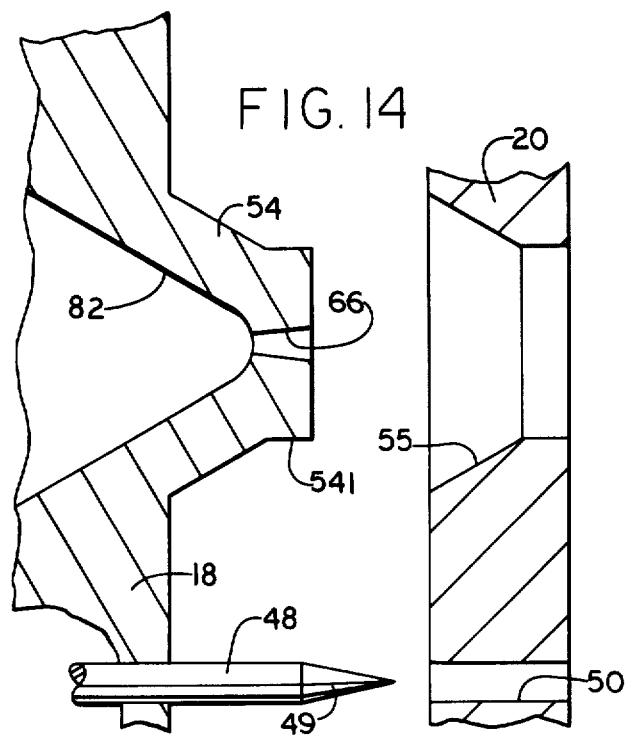
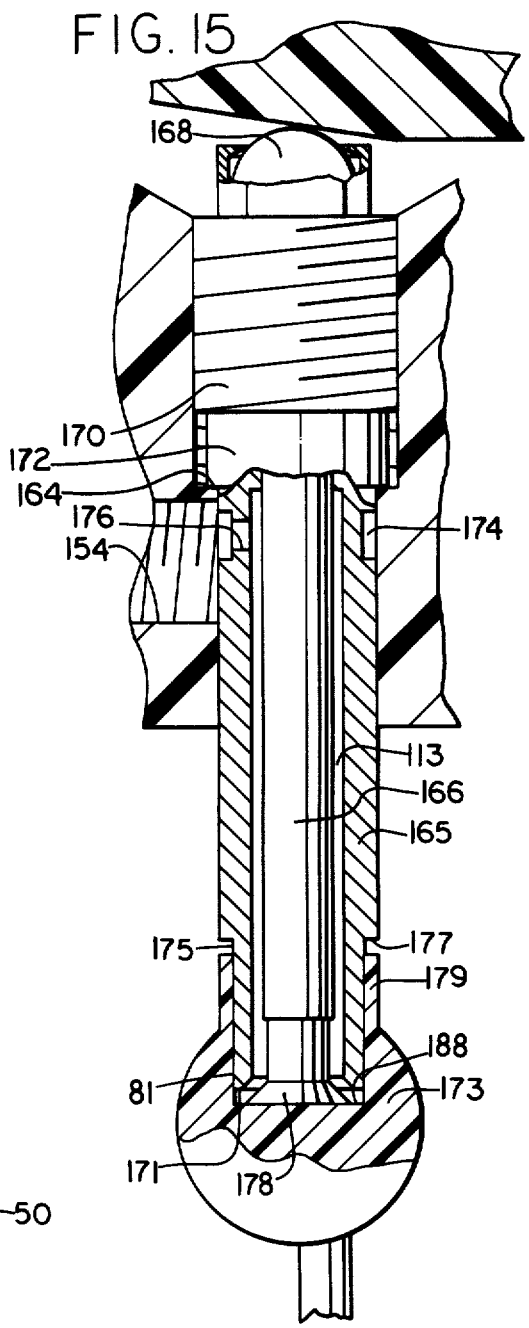
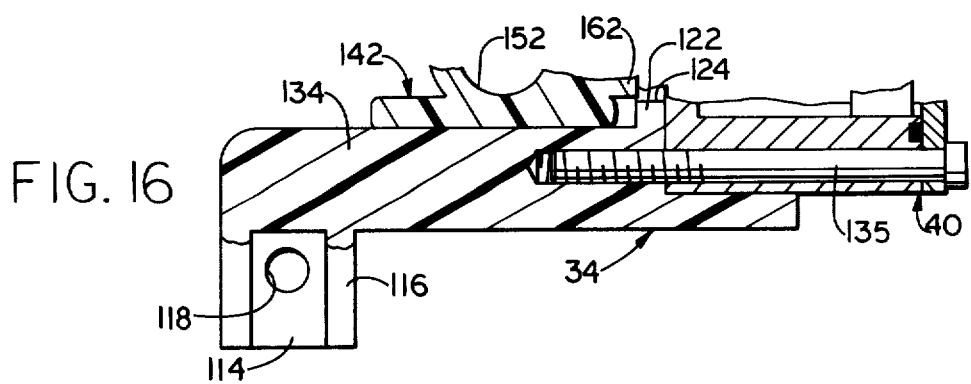

DEVICE FOR REMOVING A RUNNER FROM A MULTIPLE PLATE DIE

This invention relates to a device for removing runners from an injection molding system.

In injection molding machines, it is common to form a runner between a source of plastic material and a cavity in which an article is formed. Such a runner must be removed after a molding cycle and before a new molding cycle.

An object of this invention is to provide a runner ejector for an injection molding machine which positively removes the runner and ejects the runner after a molding cycle.

A further object of this invention is to provide a device that will mechanically and pneumatically remove a runner from a multiple stage injection molding system.

A further object of this invention is to provide a runner ejector device in which the runner is formed on a head of the runner ejector device so that the runner can be released from a die plate in which the runner forms by movement of runner ejector device away from that die plate.

A further object of this invention is to provide a device for pulling the runner from the mold plate in which it is formed, thereby freeing it for ejection from the machine.

A further object of this invention is to provide a device that mechanically breaks the molded bond between the runner and the ejection system.

A further object of this invention is to provide a device for pneumatically completing the ejection of the runner.

A further object of this invention is to provide an automatic mechanical-pneumatic device that eliminates the need for manual runner removal.

Briefly, this invention provides a runner ejection device for a multiple plate die that includes a tube having a head portion which can extend into the confines of an injection molding die and into a channel on a face of one of the die plates in which the runner forms so that runner plastic flows around the head portion and solidifies thereon to form a mechanical link between the runner and the tube. As an injection cycle comes to completion, the multiple plate die is opened sequentially to separate the runner from die plates other than that having the channel. The runner ejector completes the separation of the runner from the channel by translating the tube away from the face of the die plate having the channel. A plunger within the tube is caused to protrude from the head portion of the tube a small amount as the tube is translated away from the face of that die plate so that the runner is moved lengthwise of the tube, and the molded plastic is mechanically sheared from the head portion of the tube. The protruding end of the plunger, in cooperation with the lower end of the tube, forms an air valve so that, as the plunger is extended, the valve is opened. Air under pressure is supplied to the runner/tube interface to propel the runner away from the tube to be released from the multiple plate die.

The above and other objects and features of this invention will be apparent to those skilled in the art to which this invention pertains from the following detailed description and the drawings, in which:

FIG. 11 is a view in upright section of the runner ejector taken along line 11—11 in FIG. 9;

FIG. 12 is a view in upright section of the runner ejector in actuated position;

FIG. 13 is a view in section taken on an enlarged scale on the line 13—13 in FIG. 4;

FIG. 14 is a view in section taken on an enlarged scale on the line 14—14 in FIG. 4, plates of the machine being shown in open position;

FIG. 15 is a fragmentary view in enlarged section on the same line as FIG. 12; and FIG. 16 is a view in section taken on the line 16—16 in FIG. 9.

In the following detailed description and the drawings, like reference characters indicate like parts.

Figure 1:
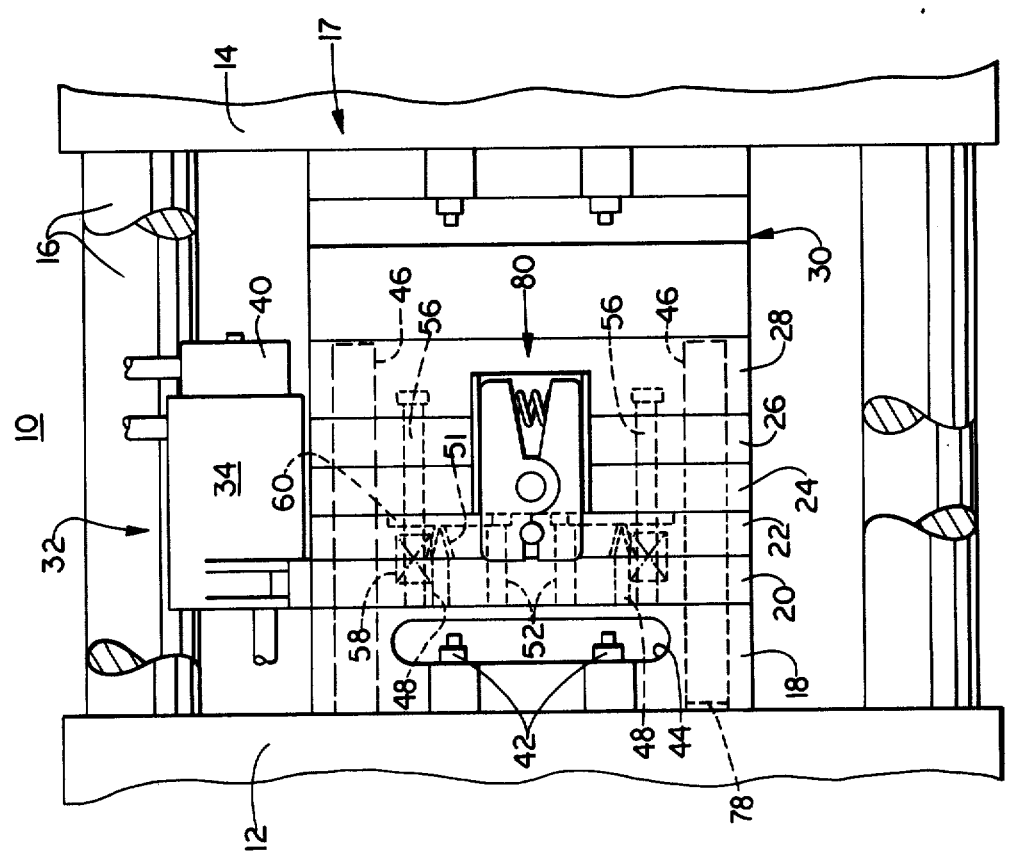
FIG. 1 is a fragmentary side elevational view of an injection molding machine showing a multiple plate die together with a runner ejector constructed in accordance with an embodiment of this invention, parts being partially cut away for clarity, the machine being shown in closed position.

FIG. 1 shows a working section 10 of an injection molding machine that is not shown in detail. The working section 10 is bounded on one end by a left side chuck plate 12 and on the other end by a right side chuck plate 14. The left and right side chuck plates 12 and 14, respectively, move toward or away from each other along a horizontal line that is guided by a set of four slide bars 16.

A multiple plate die 17 is mounted between the left and right side chuck plates 12 and 14, and is comprised of a left hand mount plate 18, a stripper plate 20, a female mold plate 22, a male mold plate 24, a spacer plate 26, a base plate 28 and a right hand mounting assembly 30. Fixedly mounted atop the stripper plate 20 is a runner ejector 32 that is comprised of a body 34, a runner carrier or ejector assembly 38, and an air cylinder 40. These parts are shown in detail in FIGS. 9 through 12 and will be described hereinafter.

Figure 2:
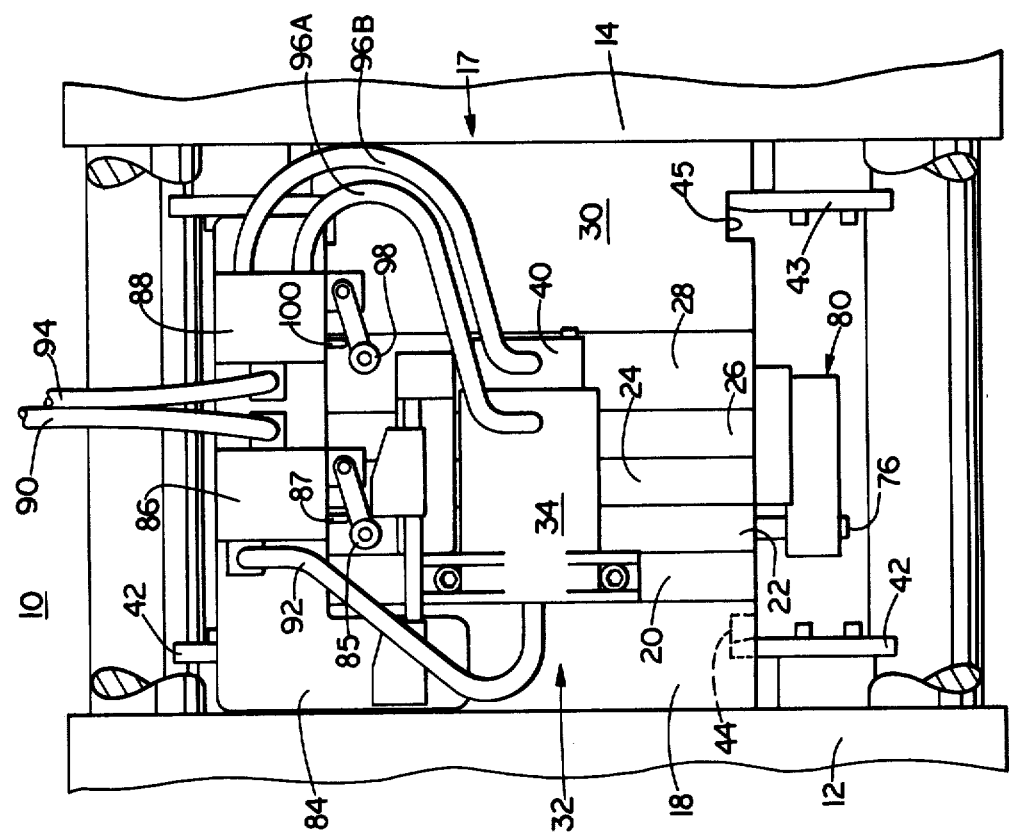
FIG. 2 is a fragmentary plan view of the injection molding machine of FIG. 1, pneumatic valves and valve trips being shown in association therewith.
Figure 4:
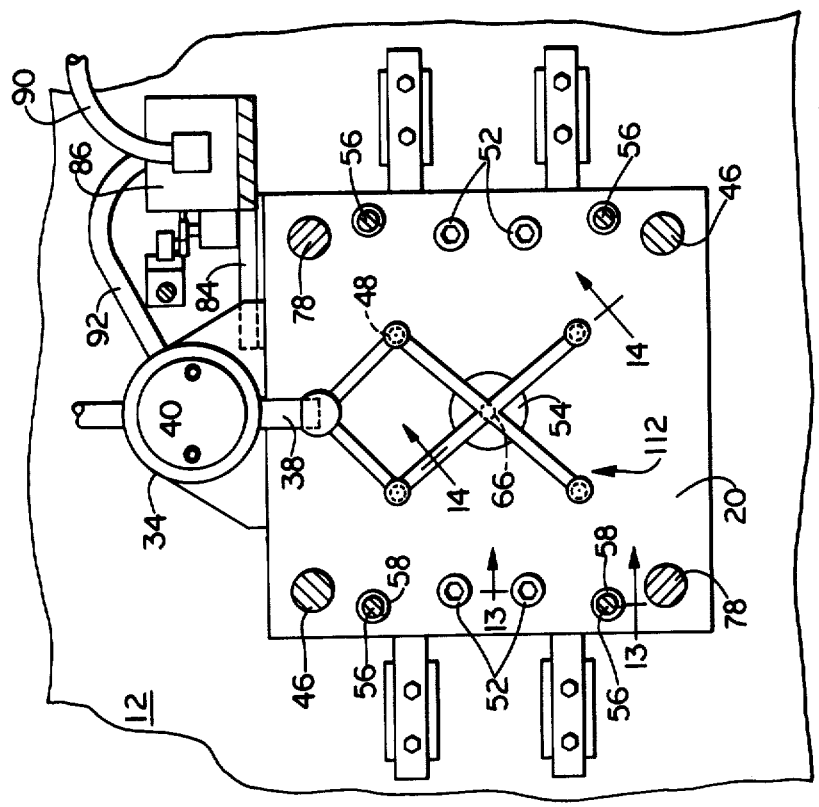
FIG. 4 is a view in section taken generally on the line 4—4 in FIG. 3, one of the pneumatic valves and the associated valve trip being shown in association with the injection molding machine.
Figure 5:
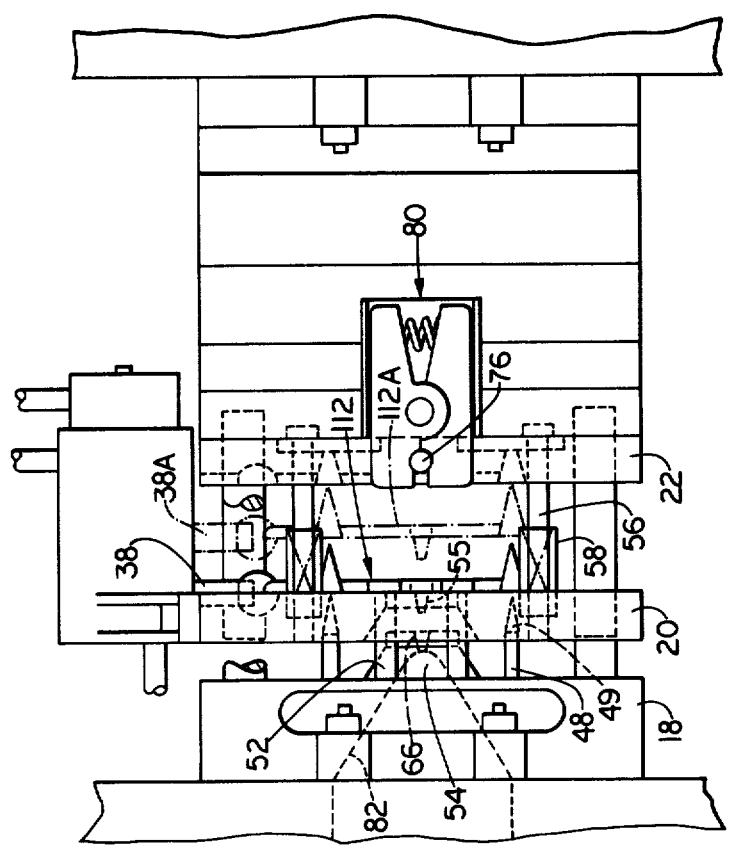
FIG. 5 is a view in side elevation of the injection molding machine, plates thereof being shown in a further state of openness, the runner ejector being shown in its actuated position in dot-dash lines.

FIG. 1 shows the multiple plate die 17 in the closed position. The left hand mount plate 18 is fixedly clamped to the surface of the left side chuck plate 12 by a set of four clamps 42, whose inner extremities cooperate with a pair of grooves 44, one of which is shown in FIGS. 1 and 2. Similarly, the right hand mounting assembly is fixedly clamped to the chuck plate 14 by clamps 43, whose inner extremities cooperate with grooves 45. A pair of guide bars 46 is rigidly affixed within the left hand mount plate 18. The guide bars 46 extend to the right therefrom to pass through guide bores (not shown in detail) in the stripper plate 20, the female mold plate 22, the male mold plate 24, the spacer plate 26, and the base plate 28. The guide bars 46 are diagonally placed with respect to each other, as is indicated in FIG. 4, the upper member being located to the left side of FIG. 4 and the lower member being located to the right side thereof. A set of four pins 48 having cone shaped heads 49 as shown in FIGS. 5 and 14 is rigidly affixed within the left hand mount plate 18 with the pins 48 extending to the right therefrom to pass through clear bores 50 in the stripper plate 20, and into concentric substantially cone shaped sockets 51 (FIGS. 1 and 3) in the left hand face of the female mold plate 22.

A set of four stop bolts 52 (FIG. 4) is rigidly affixed within the left hand mount plate 18. The heads of the stop bolts 52 pass into clear bores 53, one of which is shown in FIG. 13, in the female mold plate 22. The shafts of the bolts 52 pass through clear bores 531 of close tolerance in the stripper plate 20. This arrangement permits the stripper plate 20 to move to the right away from the left hand mount plate 18 until contact is made with the heads of the stop bolts 52, whereupon the left hand mount plate 18 and the stripper plate 20 become coupled. The lateral and vertical placement of the stop bolts 52 is shown in FIG. 4. As is shown in FIGS. 5 and 14, the central portion of the left hand mount plate 18 incorporates a generally frusto-conic boss 54 having a cylindrical head portion 541 that protrudes to the right therefrom. The boss 54 projects into a complementary recess 55 in the stripper plate 20.

The stripper plate 20 carries a set of four long stop bolts 56 as is shown in FIGS. 1 and 13. Each of the stop bolts 56 is rigidly affixed in the stripper plate 20 and projects to the right therefrom. The heads of the bolts 56 pass through clear bores 571, 572 and 573 in the male mold plate 24, the spacer plate 26 and in the base plate 28, respectively. The shanks of the long stop bolts 56 pass through clear bores with close tolerance in the female mold plate 22, one of which is shown at 574. This arrangement permits the female mold plate 22 to move to the right with respect to the stripper plate 20, until the heads of the long stop bolts 56 terminate the relative displacement thereof, by coming into physical contact with the right hand surface of the female mold plate 22. The lateral and vertical placement of the four long stop bolts 52 is shown in FIG. 4. A coaxial spring 58 is mounted on the shaft of each of the four long stop bolts 56 (FIG. 1). When the stripper plate 20 and the female mold plate 22 are in contact with each other, each compressed coaxial spring 58 resides in a pair of counterbores, one in the right hand face of the stripper plate 20, and the other in the left hand face of the female mold plate 22, as indicated at 581 and 582, respectively, in FIG. 13. The coaxial springs 58 urge the female mold plate 22 to move to the right before the stripper plate 20 moves to the right.

Figure 8:
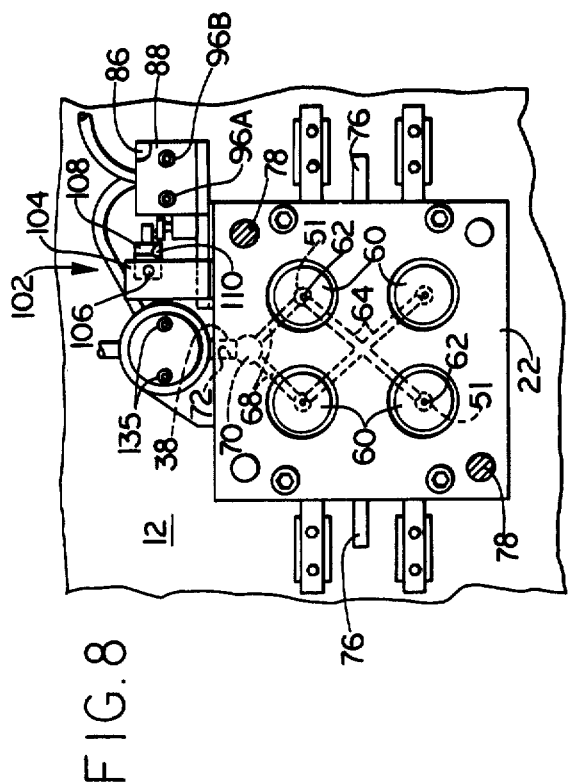
FIG. 8 is a view in section taken on the line 8—8 in FIG. 7, including the pneumatic valves and trips.
Figure 10:
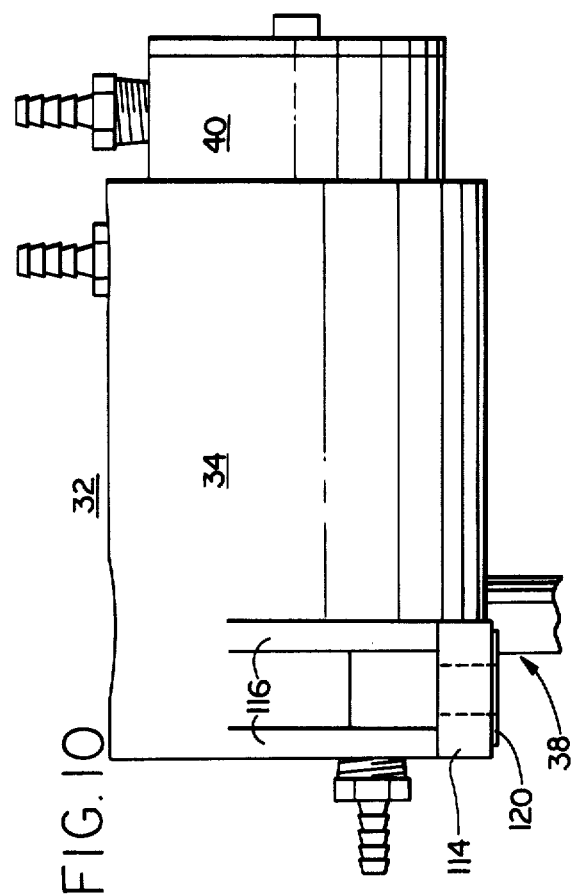
FIG. 10 is a side elevational view of the upper portion of the runner ejector of FIG. 1, the lower extremity being cut away for simplicity.
Figure 7:
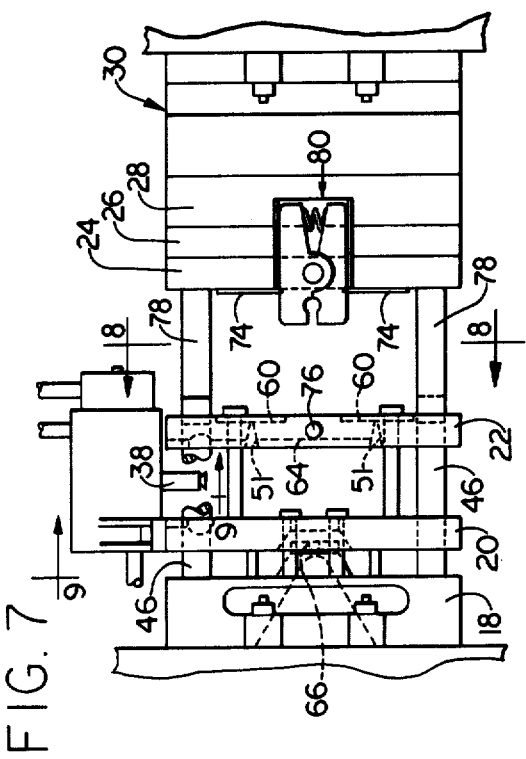
FIG. 7 is a side elevational view of the injection molding machine in its full state of openness, the runner ejector being shown in its actuated position after the associated runner has been expelled.

The female mold plate 22 incorporates, in addition to the aforesaid features, a set of four mold cavities 60 in the right hand face thereof, as is shown in FIGS. 7 and 8. Vertices of the concentric cone-shaped sockets 51 communicate with the centers of the mold cavities 60 to direct liquid plastic thereto. A system 64 of channels or grooves is incorporated in the left hand face of the female mold plate 22 and connects bases of the cone shaped sockets 51 to a central supply orifice 66 that is in turn incorporated into the right hand extremity of the boss 54 as is shown best in FIGS. 3, 4, 5 and 14. Similarly, auxiliary channels or grooves 68 (FIGS. 3 and 8) are incorporated into the left hand surface of the female mold plate 22, extending upwardly from the bases of the upper two cone-shaped sockets 51 to a first half spherical cavity 70. The half spherical cavity 70 cooperates with a second half spherical cavity 71 (FIG. 12) on the stripper plate 20 to receive a lower portion of the ejector assembly 38, which is received in access channels 72 and 73 in the female mold plate 22 and the stripper plate 20, respectively. The access channels 72 and 73 and the half spherical cavities 70 and 71 are symmetrically incorporated into the stripper plate 20 and the female mold plate 22. The ejector assembly 38 protrudes downwardly into the central portion of the half spherical cavities 70 and 71. The female mold plate 22 also incorporates a pair of pull pins 76 rigidly affixed into each side thereof and disposed along its transverse centerline as is shown in FIGS. 2 and 8, the operation of which will be described hereinafter.

The male mold plate 24 incorporates upon its left hand surface (FIG. 7), four male dies 74 that cooperate with the set of four mold cavities 60. Also extending from the left hand surface of the male mold plate 24 is a pair of guide bars 78 (FIGS. 1, 4, and 7) that is rigidly affixed therein. The guide bars pass through guide bores in the left hand mount plate 18, the stripper plate 20 and the female mold plate 22. Each of the guide bars 78 is diagonally disposed from the other, the top member being located to the right of FIG. 4 and the lower member to the left thereof. The male mold plate 24 (FIG. 7) is fixedly attached to the spacer plate 26 that is in turn fixedly attached to the base plate 28. The base plate 28 is fixedly attached to the right hand mounting assembly 30 that is in turn fixedly clamped to the right side chuck plate 14. Also mounted on the sides of the male mold plate 24 are pivots 79 for a pair of spring clamps 80, whose opposing jaws are so constructed to cooperate with the pull pins 76 of the female mold plate 22. Under sufficient force, the pair of spring clamps release the pull pins 76 as well as re-engage them on the next cycle. Channel-shaped clamp guides 791 mounted on the plates 24 and 26 limit closing movement of clamp arms of the spring clamps 80 under the influence of compression springs 792.

In operation, with the working section 10 closed, molten plastic enters through the left side chuck plate 12 and the left hand mount plate 18 by means of an inlet channel 82 (FIGS. 3 and 5) of the boss 54. The plastic flows through the central supply orifice 66 and into the channel system 64 of the female mold plate 22 where it is distributed to the four cone shaped sockets 51. Referring to FIG. 1, the molten plastic flows around the tapered ends of the set of four pins 48, through the cone-shaped sockets 51, and into the set of four mold cavities 60 of the female mold plate 22. The set of four mold cavities 60 form a confined volume by virtue of the four male dies 74 of the male mold plate 24. Air escapes between the surfaces of opposing plates to permit the complete entry of the liquid plastic. Molten plastic also passes through the auxiliary channels 68 to fill the half-spherical cavities 70 and 71, thus surrounding the lower extremity of a runner carrier head portion 81 of the ejector assembly 38 that is exposed within the half-spherical cavities 70 and 71. Sufficient time is given to allow the molten plastic to solidify within the mold cavities and the associated supply channels back to, but not including, the inlet channel 82. Then the mold is opened and the molded pieces are ejected. The opening and clearing of the mold will be discussed in detail hereinafter.

Referring to FIGS. 2 and 4, a valve mounting plate 84 is fixedly attached at its left extended extremity to the top right hand surface of the left hand mount plate 18, in such manner that it overhangs the remainder of the multiple plate die 17, but does not touch it. Therefore, the valve mounting plate 84 will remain stationary at all times, if the left side chuck plate 12 is considered stationary, while the right side chuck plate 14 is considered movable. Fixedly attached to the upper surface of the valve mount plate 84 is an ejector valve 86 and a cylinder valve 88. A supply line 90 brings shop air to the input side of the ejector valve 86, and hose 92 connects the output side of the ejector valve 86 to the ejector assembly 38 to be described in detail hereinafter. A trip roller 85 communicates with a plunger 87, as shown in FIG. 2. The trip roller 85 can be internally spring loaded toward the extended position, causing the ejector valve 86 to be closed.

A supply line 94 brings shop air pressure to the inlet side of the cylinder valve 88, the cylinder valve 88 being of the either/or type. Outlet hoses 96A and 96B communicate air to the air cylinder 40 which is a double acting cylinder. Therefore, depending upon the position of the cylinder valve 88, the air cylinder 40 will either extend or retract. A trip roller 98 is extended by internal spring pressure, thus setting the air cylinder 40 in its extended position. The trip roller 98 communicates with a plunger 100 to actuate the cylinder valve 88, thereby retracting the air cylinder 40.

Figure 6:
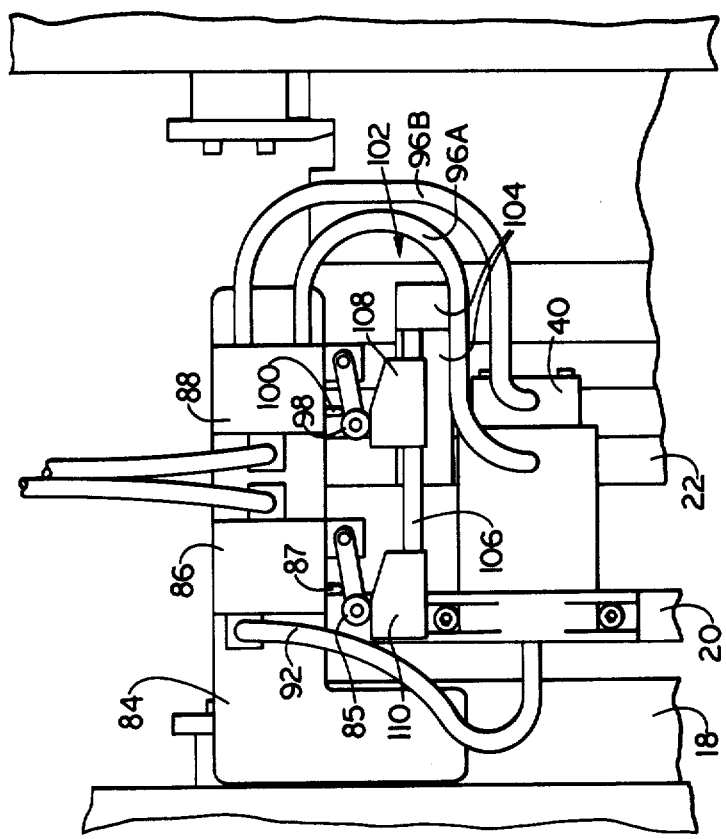
FIG. 6 is a fragmentary plan view of the machine of FIG. 5, the pneumatic valves and trips being shown in their actuated positions.

Referring now to FIGS. 6 and 8, a switch trip assembly 102 is fixedly attached to the top surface of, and near the right side of, the female mold plate 22. The switch trip assembly 102 is comprised of a trip mount 104, a slide rod 106, a cylinder trip lug 108 and an ejector trip lug 110. The cylinder trip lug 108 and the ejector trip lug 110 are slidably placed upon the slide rod 106 and clamped into place by set screws that are not shown. With respect to FIG. 6, the right hand extremity of the slide rod 106 is rigidly affixed within an elevated end of the trip mount 104 that is in turn fixedly attached at its left hand extremity to the top of the female mold plate 22. The operation of the ejector and cylinder valves 86 and 88, respectively, will be discussed hereinafter.

Figure 3:
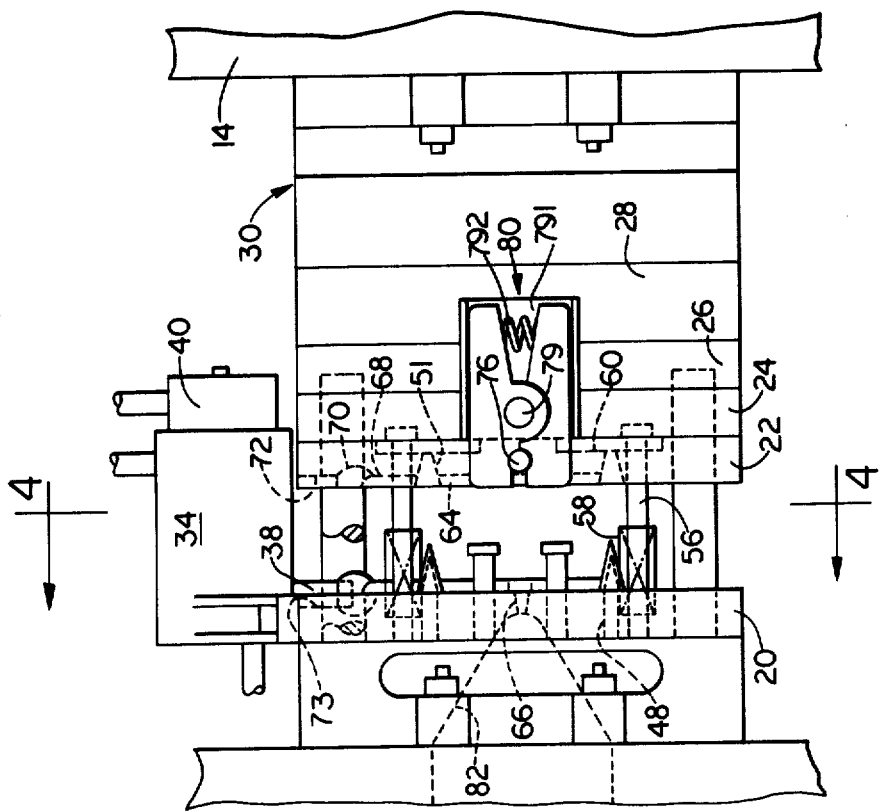
FIG. 3 is a view in side elevation of the injection molding machine, the machine being partially opened.

It is understood that when the multiple plate die 17 opens, it does so rapidly and smoothly. The following discussions of the opening sequence will be accomplished in stages, for the purpose of clarity. Referring now to FIG. 1, the plastic has been injected with sufficient time for cooling, and the opening sequence is initiated. Consider that the right side chuck plate 14 moves to the right and that the left side chuck plate 12 remains stationary. As the working section 10 expands, the four coaxial springs 58 urge the female mold plate 22 to separate from the stripper plate 20, as is best shown in FIGS. 3 and 4. The plastic material that has solidified in the cone-shaped sockets 51, the channel system 64, the auxiliary channels 68 and the substantially spherical cavity 70–71, separates from the plastic in the set of four mold cavities 60, as well as from the female mold plate 22, and remains attached to the set of four pins 48 and the end of the ejector assembly 38. This plastic material is referred to as a runner 112 and is shown in full elevational view in FIG. 4. As the heads of the long stop bolts 56 come into contact with the right hand face of the female mold plate 22, relative motion between the stripper plate 20 and the female mold plate 22 ceases, since the long stop bolts 56 are rigidly mounted on the stripper plate 20, as was previously described.

Referring now to FIG. 5, the stripping plate 20 moves to the right relative to the left hand mount plate 18, forcing the runner 112 to separate from the pins 48. The solidified plastic in the central supply orifice 66 remains with the runner 112, leaving liquid plastic in the inlet channel 82 in preparation for the next cycle. As the right hand surface of the stripper plate 20 approaches the heads of the set of four stop bolts 52, the cylinderz-trip lug 108 (FIG. 6) comes into contact with the trip roller 98, thus depressing the plunger 100 to cause the cylinder valve 88 to retract the cylinder 40. Retraction of the cylinder 40 causes the ejector assembly 38 to move to its retracted position 38A, shown in dot-dash line in FIG. 5, as will be explained in greater detail hereinafter, to cause the runner 112 to move away from the stripper plate 20 to the dot-dash line position 112A. Movement of the ejector assembly from the position 38 to the position 38A causes an ejector rod 166 (FIGS. 11 and 12), within the ejector assembly 38, to push the runner 112 downwardly a small distance to mechanically begin the separation of the runner 112 from the head portion 81 of the ejector assembly 38. This will be discussed in detail hereinafter. Then, in rapid sequence, the ejector trip lug 110 makes contact with the trip roller 85 to depress the plunger 87 of the ejector valve 86, to cause air to be supplied through the hose 92 to an annular clearance or channel 113 surrounding the ejector rod 166 to the head portion 81 of the ejector assembly 38 to cause jettisoning of the runner 112 from the bottom extremity of the head portion 81 thereof. As the heads of the set of four stop bolts 52 come to rest against the right hand surface of the stripper plate 20, relative motion between the left hand mount plate 18 and the stripper plate 20 ceases. Since no further movement of the stripper plate 20 and the female mold plate 22 is possible, the spring clamps 80 are forcefully dislodged from the pull pins 76 to permit the male mold plate 24 to separate from the female mold plate 22 so that the molded pieces can fall out the bottom of the multiple plate die 17.

Referring now to FIGS. 9–12, the runner ejector 32 is comprised of the body 34, the ejector assembly 38 and the air cylinder 40. The body 34 is a one-piece molded plastic article, the overall shape of which is tubular and incorporates the following features. A pair of mounting lugs 114 (FIGS. 9 and 10) is disposed laterally across the lower left hand end of the body 34, each mounting lug being strengthened by a pair of webs 116. Each of the mounting lugs 114 incorporates a through hole 118, and a raised circular pad 120 on the bottom side thereof. Fasteners 121 (FIG. 9) mounted in the holes 118 attach the body 34 to the stripper plate 20. A bulkhead 122 (FIG. 11) is internally incorporated within the body 34, near the right end thereof. The bulkhead 122 has a clear central hole 124. An access hole 126 is incorporated into the top of the body 34, approximate the left end thereof, while at the right end thereof an access hole 128 is likewise incorporated. At the bottom of the body 34, a slide slot 130 is provided to accommodate the ejector assembly 38. Internally, and at the top of, the body 34 is a ramp 132 that extends downwardly to the right from the access hole 126 and terminates in a flat surface 133 that continues to the right to end at the bulkhead 122. A pair of slide rails 134 (FIGS. 8 and 12) run lengthwise along the inner surface of the body 34, from the left hand end to the bulkhead 122.

The air cylinder 40 is mounted in the right hand end portion of the body 34 and is fixedly attached to the bulkhead 122 by fasteners 135 (FIGS. 8 and 11) in such manner that a piston rod 136 of the air cylinder 40 extends through the clear hole 124. An air fitting 138 is threadably mounted into the air cylinder 40 and extends upwardly through the access hole 128. When air communicates through hose 96A, the air fitting 138, and into the cylinder 40, the piston rod 136 retracts. An air fitting 140 is likewise threadably mounted into the top of the air cylinder 40 approximate the right end thereof. When air communicates through the hose 96B, the air filling 140, and into the cylinder 40, the piston rod 136 extends.

Figure 9:
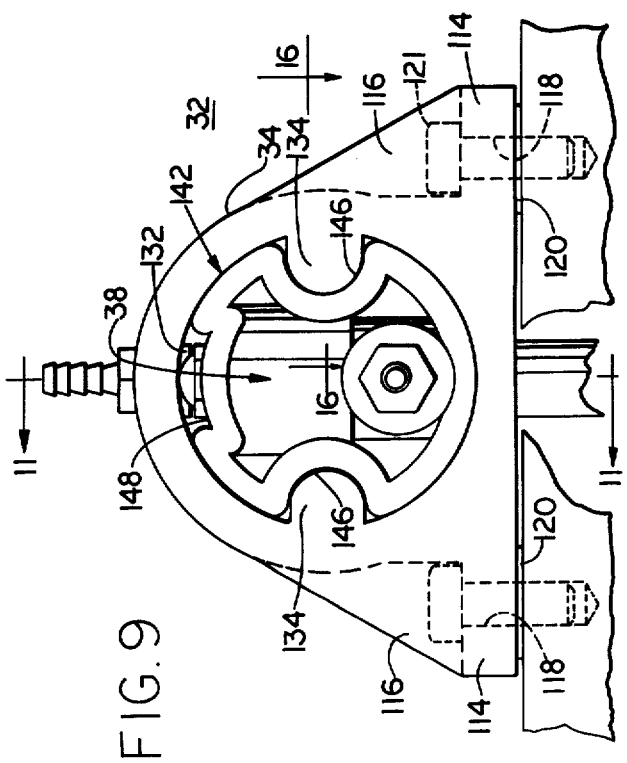
FIG. 9 is a view in end elevation of an upper portion of the runner ejector looking in the direction of the arrows 9—9 in FIG. 7, the lower extremity being cut away for simplicity.

The ejector assembly 38 includes a slide body 142 and an ejector 144. The slide body 142, shown best in FIGS. 9 and 11, is provided with a pair of grooves 146 integrally molded into the outer sides thereof to cooperate with the pair of slide rails 134 of the body 34. An external recess 148 is incorporated into the top of the slide body 34 and runs the length thereof. A transverse portion of the slide body 142 accommodates a shaft bore 150 (FIGS. 11 and 12), a threaded bore 152, an air inlet bore 154 and a rod bore 156. An air inlet fitting 158 is threadably mounted into the air inlet bore 154 which communicates with the shaft bore 150. A threaded rod 160 is threadably mounted into the rod bore 156 and extends to the right therefrom to be threadably mounted into the end of the piston rod 136 of the air cylinder 40. The piston rod 136 is turned down upon the threaded rod 160 until it comes into contact with the protruding end 162 of the slide body 142, thus locking the piston rod 136 and the threaded rod 160 together. The bore 150 is of smaller diameter than that of the upper threaded bore 152 with which it axially communicates, thus forming a shoulder 164 at their interface.

The ejector 144 is comprised of an ejector tube 165, the ejector rod 166, an ejector ball 168 and a ball retainer 170. The inside diameter of the ejector tube 165 is enlarged for most of its length save for the upper end thereof, which performs as a bearing surface and air seal about the ejector rod 166. The lower extremity of the ejector tube 165 is slightly countersunk frusto-conically, leaving a small annular flat surface 171 adjacent the outer diameter thereof. An upper end portion of the ejector tube 165 is of increased diameter to provide a flange 172 that cooperates with the shoulder 164 to retain the ejector tube 165 in the shaft bore 150. The lower extremity of the ejector tube 165 forms a portion having a cylindrical face of decreased diameter as shown at 175 to form a shoulder 177 which defines an upper end of a tubular extension 179 of an upper generally spherical portion 173 of the runner 112. The decreased diameter portion 175 is smoothly cylindrical to permit ready downward sliding of the generally spherical portion 173 and the cylindrical extension 179. The ejector tube 165 is retained within the slide body 142 by means of the ball retainer 170, which is threadably turned down against the top thereof. An air groove 174 is circumscribed about the outer diameter of the ejector tube 165 in such place that it communicates with the air inlet bore 154. An air inlet orifice 176 communicates from the bottom of the air groove 174 to the inside of the ejector tube 165. Thus, air can enter the ejector tube 165 regardless of the circumferential placement of the air inlet orifice 176.

The ejector rod 166 incorporates a snap ring groove adjacent the top thereof and a plunger head 178 at its bottom extremity. The plunger head 178 is a truncated cone that cooperates with the counterbore of the ejector tube 165. A snap ring 180, that cooperates with the snap ring groove of the ejector rod 166, retains a washer 182 and a spring 184. The spring 184 is compressively held between the top of the ejector tube 165 and the washer 182 and urges the ejector rod 166 upward, thus causing the plunger head 178 to bear against the counterbore of the ejector tube 165, effectively closing the internal air passage thereof. The length of the ejector rod 166 is such that it can urge the ejector ball 168 to the top of the ball retainer 170 but does not compress the ejector ball 168 against an integral retaining lip 186 thereof. In this manner, the ejector ball 168 is free to rotate. The outer surface of an unthreaded upper end of the ball retainer 170 is of hexagon shape to permit the use of a socket wrench to put the ball retainer 170 in place.

In operation, when the cylinder valve 88 (FIG. 6) is actuated by the cylinder switch trip 108, air under pressure is supplied through the hose 96A to the air fitting 138, causing the air cylinder 40 to move the ejector assembly 38 to the right. As the ejector ball 168 comes into contact with the ramp 132 of the body 34, the ejector ball 168 is forced downward to the position shown in FIG. 12 when the air cylinder 40 is completely retracted. As has been previously described, this operation withdraws the runner 112 from the stripper plate 20, thus clearing the runner 112 of all interference for subsequent ejection. It also moves the ejector rod 166 downward, forcing the spherical upper extremity 173 of the runner 112 to shear loose from the head portion 81 of the ejector tube 165 with the tubular extension 179 still surrounding the cylindrical face 175. The ejector valve 86 is actuated by the ejector trip lug 110 (FIG. 6) to supply air through the hose 92 to the air inlet fitting 158 (FIGS. 11 and 12), the air inlet bore 154, the air groove 174, through the air inlet orifice 176, then down the annular clearance 113 between the ejector rod 166 and the ejector tube 165, to bear against an exposed annular surface 188 within the spherical head of the runner 112. The exposed annular surface 188 corresponds to the annular flat surface 171 of the ejector tube 165. The air under pressure, bearing against the exposed annular surface 188, causes the upper spherical portion 173 of the runner 112 to separate from the bottom of the plunger head 178 and propels the runner 112 downward out of the multiple plate die 17.

The runner ejector 32 illustrated in the drawings and described above is subject to structural modification without departing from the spirit and scope of the appended claims.

Having described our invention, what we claim as new and desire to secure by Letters Patent is:

1. The combination of a molding machine which includes a pair of die plates having faces which engage face-to-face, there being a runner groove in one of said faces and means for advancing at least one of said plates toward and away from the other of said plates between open and closed positions, there being a mold cavity in communication with the runner groove and means for injecting molding material along the runner groove into the mold cavity, a runner forming in the runner groove during injection, with a device for removing the runner from the runner groove which comprises a runner carrier member having a head portion which extends into the runner groove so that a portion of the runner forms around the head portion, means for moving the runner carrier member laterally away from said one of the faces when the plates are in open position to separate the runner from the runner groove, and means for removing the runner from the head portion.

2. A combination as in claim 1 in which the means for removing the runner from the head portion includes a plunger telescopically mounted in the head portion and means for advancing the plunger to cause release of the runner from the head portion of the runner carrier.

3. A combination as in claim 2 in which there is a channel between the plunger and the head portion and means for projecting fluid under pressure along said channel to eject the runner from the head portion.

4. A combination as in claim 1 in which the head portion is tubular and the means for removing the runner from the head portion includes a plunger telescopically mounted in the head portion, there being an air channel between the plunger and the interior of the head portion, means for advancing the plunger to cause release of the runner from the head portion of the runner carrier, and means for projecting air under pressure along the air channel to eject the runner from the head portion.

5. A combination as in claim 4 in which there is a valve seat on the head portion and a valve disc on the plunger for closing the valve seat, and in which the valve disc is opened when the plunger advances to cause release of the runner to permit projection of air.

6. A combination as in claim 5 in which there is a transverse face on the tubular portion surrounding the valve seat and the runner is advanced from said face when the plunger advances.

7. In combination with a multiple plate die utilized in an injection molding process, a runner ejector comprised of a tubular member that extends into a runner channel in one of the plates of the die, around the end of which runner plastic can flow and solidify to form a mechanical link between the runner and the tubular member, means for translating the tubular member laterally in the direction of the opening of the die plates to cause the separation of the runner from said one of the plates, a plunger within the tubular member, means for causing the plunger to project from the tubular member to mechanically shear loose the bond between the runner and the tubular member, extended extremities of the tubular member and the plunger cooperating to form an air valve, and means for directing air under pressure within the tubular member to exit through the air valve to jettison said runner from the extended extremity of the tubular member and out of the confines of the multiple plate die.

8. A combination as in claim 7 wherein there is a closely toleranced bore located symmetrically of the plane of separation of the die plate having the runner channel and an adjacent plate communicating with the runner channel and the tubular member extends into said closely toleranced bore to fit tightly therein.

9. A combination as in claim 7 wherein the means for causing the plunger to project includes a ramp and means operated by the ramp for advancing the plunger when the tubular member is translated.

10. A combination as in claim 9 which includes means for resiliently urging the plunger to retracted valve closed position.

* * * * *